United States Patent Office 2,900,698
Patented Aug. 25, 1959

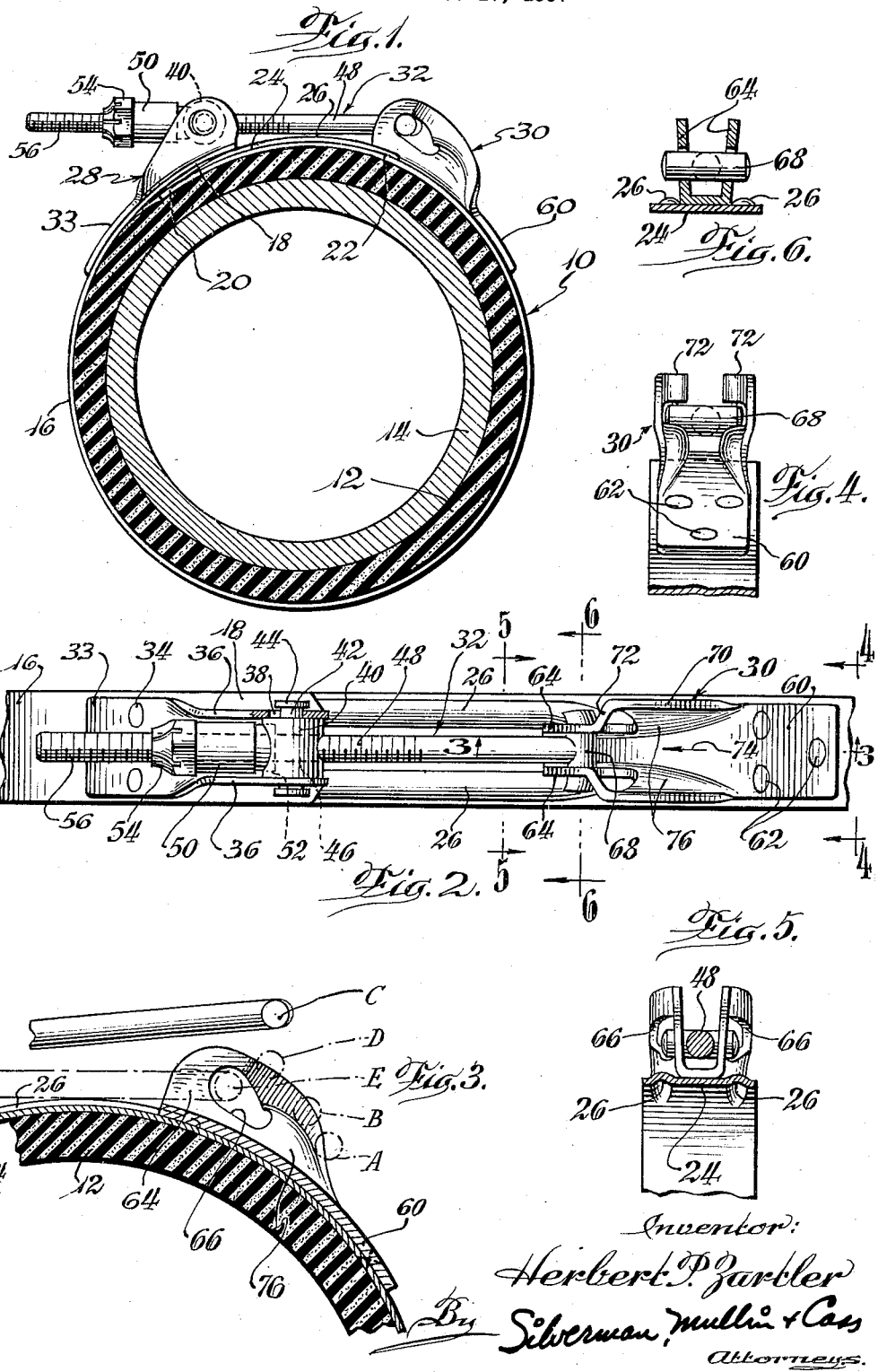

2,900,698

QUICK ACTING HOSE CLAMP

Herbert P. Zartler, Hillside, Ill., assignor to Wittek Manufacturing Co., Chicago, Ill., a corporation of Illinois Application December 17, 1957, Serial No. 703,442

5 Claims. (Cl. 24—279)

This invention relates generally to hose clamps, and more particularly is concerned with a quick release hose clamp of the type described and claimed in my U.S. Patent 2,724,885.

The present invention comprises an improvement upon the said hose clamp primarily in that the hose clamp contemplated by this invention is simpler in construction and operation although it has substantially the same basic structure as the hose clamp of the said patent.

In the hose clamp of the said patent there were provided a tension band having free ends, a journal formation on one end of said band with a T-bolt pivotally mounted for free swinging movement in the journal, with the T portion of the bolt extending toward the second free end. At the second end there was provided a retainer for the T-bolt called a coupler member in the said patent, which included a base and a pair of laterally spaced ears, each upstanding on the base and having a continuous peripheral edge. In this manner there was great strength achieved. The T-bolt was then adapted to be engaged to be seated between the ears by means of a translative movement along a guideway leading to the interior of the ears, so that there were portions of the ears presented endwise engaging the T of the T-bolt. In one embodiment portions of the ears were punched or upset outwardly, and in another embodiment of the said patent there were apertures seating the T of the bolt. This invention, while illustrated and described in connection with the second of the above described embodiments, is also applicable to constructions in which the first embodiment may be used. The apertured ears are preferred.

An important object of the invention is to shorten the path or guideway which extends from the peripheral edges of the ears to the seat for the T of the bolt. This enables the T-bolt to be engaged and seated with a minimum of manipulation.

Still a further object of the invention is concerned with a construction whereby, as the T is moved in the guideway from the peripheral edge in a generally radial direction to be seated, there is substantially less circumferential movement than was required of the bolt in the said Patent 2,724,885.

In connection with the object immediately described above, in causing engagement between the second end of the band having the coupler member or bolt retainer and the bolt, it is necessary first that the bolt be moved past the guideway and then dropped into the guideway and taken up prior to applying tightening tension. This could be considered the play or extent of clamp spread necessary to complete engagement and disengagement of the ends of the hose clamp. Such manipulation relates to the time it takes to assemble the hose clamp upon a hose or disassemble the same, and an important object of the invention is to cut down this time by decreasing the distance which the T portion of the bolt is required to travel circumferentially from the entrance of the guideway to the seat. Thus, the play or clamp spread is decreased.

Still a further object of the invention is to provide a hose clamp in which the T portions of the bolt protrude through the apertures formed in the seat so that the ears of the bolt retainer or coupler member which are closest to the opposite end of the tension band are fairly close together and less likely to spread on application of tension.

Another important object of the invention is to provide a hose clamp of the character described in which the entrance to the passageway which leads the T of the bolt to its seat is more accessible and more readily entered than in the said patented structure, this being true whether the T-bolt is moved from a position upon the rear of the coupler member or bolt retainer forwardly, or whether it is merely slipped in immediately above the passageway and pushed into place.

Many other objects will appear as the detailed description of the invention proceeds, and it is contemplated that the objects stated in the above referred to patent will also be achieved in an improved manner by this invention. Variations are capable of being made without departing from the spirit of the invention. In accordance with the patent laws a preferred embodiment of the structure contemplated by the invention is set forth in the accompanying drawing and described in considerable detail in the description which follows.

In the drawings:

Fig. 1 is a sectional view through a hose secured to a pipe or conduit of some sort and having a hose clamp constructed in accordance with the invention secured thereto, the said hose clamp being shown in side elevation.

Fig. 2 is a top plan view of the hose clamp on a relatively enlarged scale showing the same assembled.

Fig. 3 is a fragmentary sectional view taken through the hose clamp generally along the line 3—3 of Fig. 2 and in the indicated direction.

Fig. 4 is an end-on view taken as a section through the hose clamp along the line 4—4 of Fig. 2 and in the indicated direction.

Fig. 5 is a sectional view through the line 5—5 of Fig. 2 and in the direction indicated.

Fig. 6 is a sectional view along the line 6—6 of Fig. 2 and in the direction indicated.

As in the case of the patented structure of Patent 2,724,885, the hose clamp of the invention has a tension band adapted to be constricted about a hose or conduit, usually to couple a flexible hose with a less flexible conduit or pipe and having two free ends which may pass inside one another in conventional design. The one free end has a journal thereon comprising a pair of ears engaging the reduced diameter ends of a hollow trunnion through which extends the straight end of the shank of the T-bolt. The other effective end of the tension band which is substantially spaced from the actual physical end has a bolt retainer or coupler member formed of a stamping which includes a pair of ears arranged in planes substantially perpendicular to the axis of the clamp. The portion of the band which extends from the effective end to the physical end of the bolt retainer portion of the band is known as the extender and is overlapped by the said one free end in a manner which is well-known. Obviously the invention does not require the use of such an extender.

The T portion of the bolt extends to the bolt retainer or coupler member and is seated in a seat or recess formed in the ears, the distance between the ears of this seat being less than the length of the T so as to prevent the T from being pulled out from between said ears. The seat or recess where the T of the T-bolt is disposed is reached either directly by a movement substantially radial from the outer edges of the ears following which a slight circumferential movement tends to bring the two ends of the tension band closer together and seat the T-bolt; or the T-bolt may be laid upon the coupler member in the back end thereof, pulled forward and will be guided into the passageway after the slight circumferential movement above described may take place.

As stated in the objects above, the invention herein is principally concerned with the formation of the coupler member or bolt retainer in such a manner as to decrease the extent to which the bolt need be lengthened in order to assure that it will enter the passageway and be able to bring the ends of the band together. Also, the entrance to the recess or seat for the T-bolt is more easily reached and because of the particular construction shown and described hereinafter, a simpler and stronger and more easily formed structure may be obtained.

Reference character 10 is used generally to designate the hose clamp, and it is shown engaged on a relatively resilient hose 12 which in turn is secured by the hose clamp to a rigid pipe 14 of metal or the like. The hose clamp 10 is formed of a strip of metal in circular formation arranged to open to maximum diameter by virtue of resiliency provided during manufacture. The hose clamp can be adjusted to different diameters, rendering the same more flexible and universal in use. The strip of metal will be termed the tension band 16 hereinafter, and the same is provided with two free ends which are designated 18 and 20. Reference will be made to an effective end 22 which, it will be noted from Fig. 1, is spaced a distance circumferentially from the physical free end 20 giving rise to the so-called extender 24 which is overlapped by the end 18 during use of the hose clamp 10. This is primarily for the purpose of attempting to apply a uniform constriction about the circumference of the hose 12, notwithstanding the fact that the only portion of the tension band 16 which is under tension is that larger portion between the ends 18 and 22. This also prevents pinching of the hose during use. The extender 24 will be under compression normally and tend to bulge outwardly, and hence, the same may be provided with ribs 26 formed therein. The details of this structure are described and claimed in my co-pending application Serial No. 703,403, filed December 17, 1957, and entitled "Hose Clamp Band." Although in the said Patent 2,724,885 where the reference "free ends" was to the functional ends thereof, in this application 18 and 20 will be considered the free ends and 22 will be considered the effective free end of the tension band 16.

The free end 18 has secured thereto a formation or mounting designated generally by the reference character 28 and which may be termed a trunnion retainer. To the effective free end 22 there is another formation secured thereto designated 30 which may be termed the bolt retainer. Extending between these formations is a T-bolt 32, and it will be seen that shortening the connection of the T-bolt 32 between the two formations 28 and 30 will result in decreasing the diameter of the hose clamp 10, whereas increasing the distance between the connection of the T-bolt 32 between the said formations 28 and 30 will increase the diameter of the hose clamp 10. In order to enable the hose clamp to be applied quickly to the hose 12, it is not necessary to completely disengage the T-bolt 32 from the formation 28, but only the T head thereof need be disengaged from the formation 30.

Considering now the details of the structure, the trunnion retainer 28 is preferably formed of a single stamping which has a flat portion 33 spot welded, or in any other way secured to the tension band 16, as shown at 34, having its forward portion arranged with a substantially oval-shaped cross section giving rise to a pair of substantially parallel, integral ears 36, each having an aligned aperture 38 therein. A trunnion 40 is journalled between the ears 36, and the said trunnion is of generally cylindrical formation having reduced end formations 42 which engage in the said aperture 38 and are provided with integral mushroom-like ends 44 to prevent spreading of the ears 36. This particular structure is described and claimed in my co-pending application Serial No. 703,443 filed December 17, 1957, and hence, will not be further discussed herein. Obviously, any suitable construction of trunnion may be journalled between the ears 36 in any desired manner.

The trunnion 40 is provided with a transverse recess 46 through which the shank 48 of the T-bolt 32 freely extends. The trunnion may include the bushing or stem 50 either secured in a seat 52 provided therein, or loosely disposed to engage in the said seat, said stem or bushing forming a friction thrust bearing for the nut 54 engaged on the end 56 of the T-bolt 32 and used to take up or release the shank 48, respectively shortening or lengthening the connection between the trunnion retainer and the formation 30. The formation 30 is also preferably stamped as an integral formation from a single member of metal and includes a flattened portion 60 which is secured by spot welding or some other manner to the tension band 16, as shown at 62. The forward portion of the said formation 30 will be considered that part to the left of the flattened portion 60, as shown in Fig. 2, and it will be noted that this is channel bent to form the parallel ears 64 which are apertured as shown at 66. The seat for the T 68 of the T-bolt comprises the forwardmost portion of the aperture 66, and the ears at this point are closest together. A comparison of the proportionate distance between the ears 64 at their forwardmost location of the structure herein with the proportionate distance between the ears of the structure shown in the said Patent 2,724,885 will indicate that the ears herein are much closer together, the only limitation being the diameter of the shank 48 of the T-bolt 32. In this manner the likelihood of the ears 64 spreading is decreased and greater tension can be applied. As shown in Fig. 2 the T 68 of the T-bolt may be provided with offset ends to further prevent spreading of the ears 64, but the details of this structure are described and claimed in my copending application Serial No. 703,444, filed December 17, 1957. Obviously, the conventional T head of the type shown in the said Patent 2,724,885 may be advantageously used in this invention.

As shown best in Fig. 2, the ears 64 are integrally connected with outwardly bowed portion 70 which are outwardly offset from the forward portion of the ears by means of a fairly sharp bend 72 to give rise to a trough-like entrance indicated generally by the arrow 74 in Fig. 2. The flat portion 60 is formed with a pair of forwardly extending tapered guide portions 76 which form the bottom of the trough-like entrance 74. The width of the bowed portions 70 is such that the T 68 freely passes along the same, and as will be seen at A and B, there are broken line representations of two positions of the T of the bolt 32. The bolt may be laid upon the flat portion 60 and quickly pulled forward, and it will ride up the formations 76 into the trough or entrance 74 and be guided radially toward a seating position within the recesses or apertures 66. The apertures are somewhat teardropped shaped in order to enable such a movement to be possible. The bends 72 are therefore narrow bridging connections between portions 64 and 70.

It is preferred, however, that the movement of the T 68 to its seated position be that indicated in Fig. 3 by the path defined at C, D and E. This movement which is generally a radial inward movement along the bend 72 and into the aperture 66 requires the minimum length of the T-bolt 32 to be unscrewed and is a sort of pivotal movement of the T-bolt 32 about the axis of the trunnion 40 into the forward end of the trough-like entrance 74. As in the case of the structure of my patent, once the T is seated it is not readily removed without decreasing the diameter of the tension band at least slightly to enable the T to be moved out from between the ears 64. The amount which it must be moved, is of course substantially less than required in the case of the structure shown in my patent above referred to.

As previously stated, the bolt retainer 30 may be provided with circular lugs similar to those shown in the said patent, which lugs are integral with the ears 64 spaced slightly outward of the aperture 66 to confine lateral movement of the T of the head, or to frictionally engage the same so that when seated the T will be held firm while taking up on the bolt 32. Such lugs are not necessary, however, to achieve the benefits and advantages of the invention herein.

It is believed that the invention has been fully described such as to require no additional details in order to enable those skilled in the art to understand and practice the same and to construct hose clamps embodying the same. It is desired to emphasize that the improvement comprising this invention and defined in the claims which follow is applicable to a wide variety of structures differing only in minor details and unimportant minutiae. For example, the trunnion, trunnion retainer, bolt, nut, and the T head may take many different forms. The head need not be circular in cross section, need not be integral with the shank of the bolt 32, and as pointed out, need not have the specific configuration shown in the drawings.

I claim:

1. A hose clamp of the quick release type comprising, a tension band having a pair of free ends adapted to be drawn together to apply tension to the band, a journal formation on one free end, a T-bolt pivotally mounted for swinging movement in said journal with the T-portion of the bolt extending to the second free end, a retainer for said T-portion secured on said second free end and having a base and a pair of ears upstanding on the base arranged in planes generally perpendicular to the axis of the clamp, said ears being spaced apart a substantially uniform distance less than the length of said T-portion and being apertured to enable a seating of the T-portion therein, and an outwardly opening trough-like formation integral with said ears and rearward thereof, said formation being of suitable dimension along substantially the entire length thereof to freely accommodate said T-portion therein and connected with said ears by a pair of bent bridging segments, said bridging segments defining guide means extending inwardly into the trough from the outer edge of said formation and terminating at the apertures of the ears, said base having means located in said trough for leading the T-portion to said apertures when inserted into the trough outwardly of said segments.

2. A hose clamp of the quick release type comprising, a tension band having a pair of free ends adapted to be drawn together to apply tension to the band, a journal formation on one free end, a T-bolt pivotally mounted for swinging movement in said journal with the cross-arm of the T-bolt extending to the second free end, a retainer formation secured on the second free end for said cross-arm comprising, a base member, and a pair of ears upstanding on said base member generally perpendicular to the axis of the clamp, each ear including a forward portion and a rear portion connected by a sharp bend extending outwardly relative to the second ear, said forward portions being spaced apart a substantially uniform distance less than the length of said cross-arm, said rear portions being spaced apart a substantially uniform distance greater than the length of the cross-arm, said forward portions having aligned apertures, said apertures extending into the connecting bends for passing the cross-arm of the bolt into the apertures, said bends including guide means extending downwardly toward said apertures for guiding the cross-arm into said apertures to secure the clamp with said cross-arm engaged against edges of the apertures.

3. A clamp as described in claim 2 in which said rear portions form a trough-like formation terminating at said bends, each rear portion having a bottom ramp facing inwardly toward the second rear portion, each ramp terminating at one of the apertures so that the cross-arm is directed toward said apertures when placed into the trough spaced outwardly from said bends.

4. In a hose clamp of the character described in which a T-bolt is journalled on one end of a tension band and a T-retainer is secured on the second end of the band to enable quick release or securement of said clamp, said retainer comprising an integral formation having a pair of upstanding, parallel ears, said ears having forward portions spaced apart a distance less than the length of the cross-bar of the T-bolt and rearward portions formed of a pair of parallel walls spaced apart more than the length of the said cross-bar, relatively sharp connecting bends formed between said forward and rearward portions, said forward portions having aligned apertures, said parallel walls forming said rearward portions into a trough-like formation terminating at said bends, said parallel walls being slotted at said termination to pass the cross-bar of said bolt, and said bends including guide means between the said slots and apertures for engaging said cross-bar in a direction downward toward the band for guiding the cross-bar into the apertures when the clamp is secured.

5. In a hose clamp as described in claim 4 in which said trough-like formation has bottom ramps leading into the apertures.

References Cited in the file of this patent
UNITED STATES PATENTS
2,727,292  Houghton _____ Dec. 20, 1955